Feb. 20, 1940.  A. B. POOLE  2,191,221

SYNCHRONOUS ELECTRIC MOTOR STRUCTURE

Filed July 16, 1938   2 Sheets-Sheet 1

Inventor
Arthur B. Poole
Seymour Earle Nichols
Attorneys

Feb. 20, 1940. A. B. POOLE 2,191,221
SYNCHRONOUS ELECTRIC MOTOR STRUCTURE
Filed July 16, 1938 2 Sheets-Sheet 2
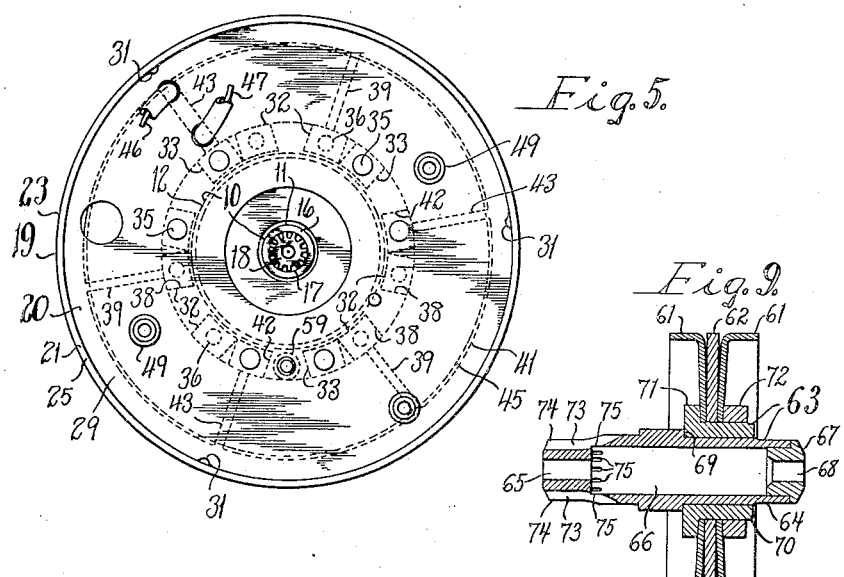
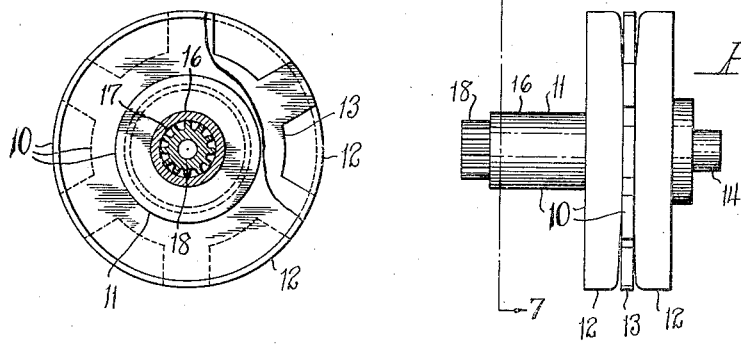
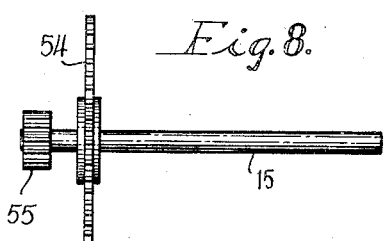
Inventor
By Arthur B. Poole
Seymour Earle Nichols
Attorneys Patented Feb. 20, 1940

2,191,221

UNITED STATES PATENT OFFICE 2,191,221

SYNCHRONOUS ELECTRIC MOTOR STRUCTURE

Arthur B. Poole, Bristol, Conn., assignor to The E. Ingraham Company, Bristol, Conn., a corporation of Connecticut Application July 16, 1938, Serial No. 219,493

8 Claims. (Cl. 172—278)

This invention relates to improvements in synchronous electric motor structures of the type primarily designed for the propulsion of clocks and other time-instruments, though useful in a wide variety of other situations. More particularly, the present invention is concerned with the rotor-structure and the operatively-connected parts of such a synchronous electric motor structure.

One of the objects of the present invention is to provide a superior synchronous electric motor structure wherein the thorough and complete lubrication of the rotor-unit is assured.

Another object of the present invention is to provide a superior construction and arrangement of parts in a synchronous electric motor structure whereby the rotor-unit may be assured of an adequate supply of lubricant by means of a reduction-train connected to and propelled by the said rotor-unit.

A further object of the present invention is to provide a superior synchronous electric motor structure having simple, reliable and long-wearing means for supporting the rotor-unit thereof.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 5 is a view of the motor structure in rear elevation, substantially corresponding to Fig. 1 save that the bearing-plate and reduction-gear-train have been removed to expose the drive-pinion;

Fig. 6 is a view in side elevation of the rotor-unit;

Fig. 7 is a transverse sectional view taken on the line 7—7 of Fig. 6;

Fig. 8 is a view in side elevation of the unit comprising the center-shaft and the pinion and gear-wheel carried thereby; and Fig. 9 is a view in central longitudinal section of a modified form of rotor unit.

Figure 1:
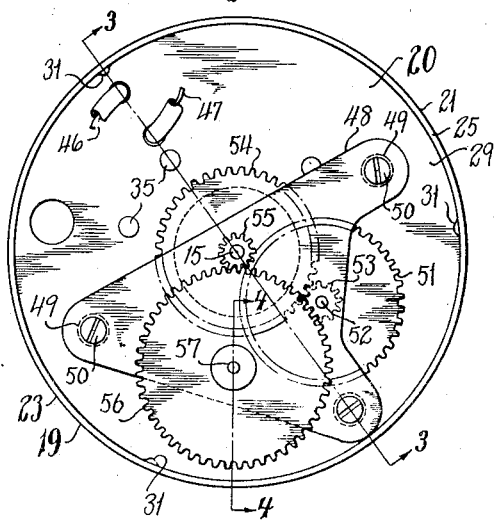
Fig. 1 is a rear-face view of a synchronous electric motor structure constructed in accordance with the present invention.
Figure 2:
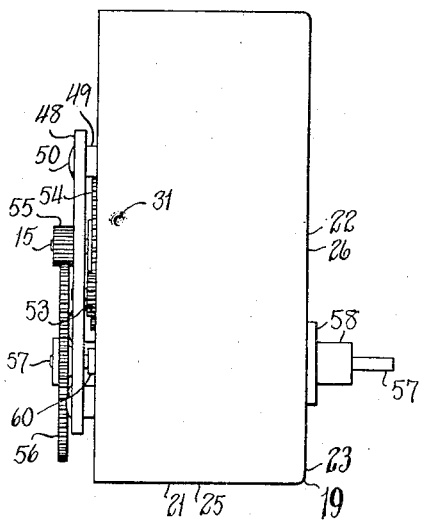
Fig. 2 is an edge view thereof.

The particular synchronous electric motor structure herein chosen for the purpose of illustrating the present invention includes a rotor-unit, generally designated by the reference character 10, and including a rotor-hub 11, which is preferably formed of brass or the like, and upon which is rigidly mounted a pair of corresponding but oppositely-facing cup-shaped rotor-elements 12—12, preferably formed of permanent-magnet material such as hardened steel or its equivalent. The said cup-shaped rotor-elements 12—12 are spaced from each other by a salient-poled rotor-unit 13 which may be conveniently made of soft iron or other non-permanent magnetic material. The cup-shaped rotor-elements 12—12 are substantially smooth upon their outer peripheries and are not provided with geometrically-salient poles, but owing to their permanent-magnet character, are adapted to receive magnetic "spottings," so to speak, which will be impressed upon them by the adjacent salient poles of a stator-structure to be more fully hereinafter described.

The rotor-hub 11 is, as shown, provided at its forward end with a sleeve-like bearing-portion 14 which bears upon the adjacent surface of a center-arbor 15 to be more fully hereinafter described. The rear end of the rotor-hub 11 is formed with a rearwardly-extending sleeve-like portion 16 having an axial passage 17 extending therethrough, as well as through the main portion of the adjacent rotor-hub 11 proper, as is especially well shown in Fig. 3. The internal diameter of the axial passage 17, just referred to, is considerably larger than the external diameter of the center-arbor 15 which extends therethrough, and receives at its rear end, with a drive-fit, the forward end of a drive-pinion 18 which latter bears with freedom for rotation upon the rear portion of the center-arbor 15. As the drive-pinion 18 is thus installed in the rear end of the sleeve-like portion 16 of the rotor-hub 11, the slots between the gear-teeth of the said drive-pinion provide a plurality of oil-passages through which lubricant may pass to the interior of the rotor-hub for distribution between the contiguous bearing-surfaces of the latter and the center-arbor 15.

The rotor-unit 10, above described, is circumferentially enclosed within a stator-structure which is shown and described in detail in my co-pending application, Serial No. 177,839, filed December 3, 1937.

The stator-structure, above referred to, includes a cup-shaped pole-unit, generally designated by the reference character 19, and a complementary disk-like pole-unit, generally designated by the reference character 20, both of which units are composed of suitable magnetic material such, for instance, as soft iron, silicon steel, or the like.

In the instance shown, the cup-shaped pole-unit 19 is of laminated character and includes a rearwardly-extending annular flange or skirt 21 and an end-wall 22 extending perpendicularly with respect to the axis of the center-arbor 15. The cup-shaped pole-unit 19 is composed of an outer cup-shaped member, generally designated by the reference character 23, and an inner cup-shaped member generally designated by the reference character 24 and snugly fitting within the said outer cup-shaped member 23. The outer cup-shaped member 23, just above referred to, includes a relatively-deep rearwardly-projecting flange or skirt 25 and an end-wall 26. In a similar manner, the inner cup-shaped member 24 of the cup-shaped pole-unit 19 includes a relatively-shallow rearwardly-extending skirt or flange 27 and an integral end-wall 28. By reference to Figs. 3 and 4, it will be noted that the flange or skirt 27 of the inner cup-shaped member 24 is of lesser depth than the adjacent flange or skirt 25 of the outer cup-shaped member 23, to thus provide for the mounting of the disk-like pole-unit 20 in a manner as will presently appear.

The disk-like pole-unit 20 comprises outer and inner disks 29 and 30 respectively, both of which fit within the otherwise open end of the cup-shaped pole-unit 19 in such manner that the inner disk 30 rests against the rear edge of the flange or skirt 27 of the inner cup-shaped member 24.

For the purpose of rigidly securing the pole-units 19 and 20 together, the skirt or flange 25 of the outer cup-shaped member 23 of the said cup-shaped pole-unit 19 is provided with a plurality of nibs or indents 31 which extend over the outer disk 29 of the disk-like pole-unit 20.

Projecting rearwardly from the end-wall 22 of the cup-shaped pole-unit 19 is an annularly-arranged series of bar-like salient poles 32 formed of suitable magnetic material and arranged in three (more or less) relatively-closely-spaced pairs around the center-arbor 15, before referred to. As will be noted by reference to Fig. 5 of the drawings, the pairs of salient poles 32 have relatively-wide gaps between them, into which forwardly project a corresponding number of pairs of salient poles 33 which extend forwardly from the disk-like pole unit 20. The spacing of the salient poles 32 and 33 is such that when they are all assembled, the pairs of salient poles 32 alternate in an annular direction with the pairs of salient poles 33.

The salient poles 32 and 33 correspond to each other in size and form to facilitate manufacture and to render the said salient poles interchangeable one for the other. Each of the said salient poles 32 and 33 is of substantially-rectangular form in cross-section throughout the major portion of its length and is provided at one end with a cylindrical shank 34 for extension through a suitable perforation in the particular pole-unit 19 or 20 of which it may form a part. Preferably and as shown, each shank 34 is headed over as at 35 against the outer face of the adjacent pole-unit, to firmly anchor the particular salient pole in place.

At its end opposite its shank 34, each salient pole 32 and 33 is formed with a cylindrically-contoured stabilizing-tenon 36 for the purpose as will be presently described.

Figure 3:
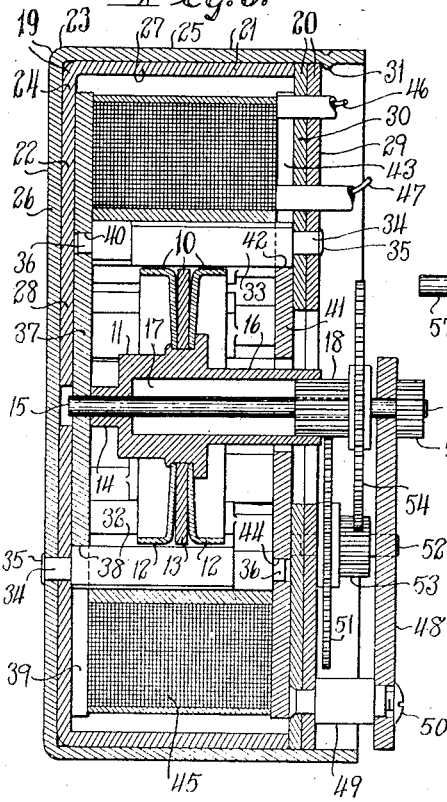
Fig. 3 is a transverse sectional view taken on the line 3—3 of Fig. 1.
Figure 4:
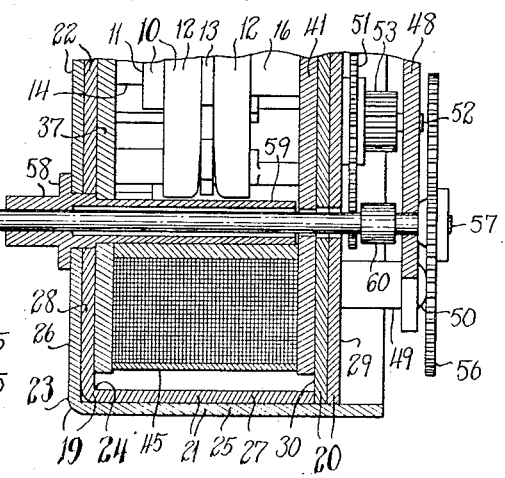
Fig. 4 is a fragmentary transverse sectional view taken on the line 4—4 of Fig. 1.

Positioned against the inner face of the end-wall 22 of the cup-shaped pole-unit 19 is a shading-disk 37 formed of copper or other suitable high-electroconductive material and provided with an annular series of substantially-rectangular perforations 38, each of which is adapted in shape and location to snugly fit over the base-portion of one of the bar-like salient poles 32 of the pole-unit 19. Each alternate one of the perforations 38 is intersected by a radial slot 39 which thus serves to interrupt the flow of induced current in the portion of the shading-disk 37 surrounding the particular salient pole. The remaining three perforations 38 are not intersected by slots, but the material of the shading-disk 37 which surrounds them is uninterrupted and provides a complete electrical path for the flow of induced current around the particular three salient poles 32 extending therethrough. From the foregoing, it will be seen that each alternate one of the salient poles 32 is shaded, so to speak, by the shading-disk 37, so that the magnetic flux in these particular salient poles will lag with respect to the magnetic flux in the remaining three unshaded salient poles 33, so as to produce a rotating-field effect. In addition to the perforations 38 and the radial slots 39, the shading-disk 37 is provided with an annular series of sockets 40 into each of which projects the stabilizing-tenon 36 of one of the salient poles 33 (Fig. 3).

In a manner similar to that described in connection with the cup-shaped pole-unit 19, the disk-like pole-unit 20 has located against its inner face a shading-disk 41 corresponding in its main functions and features to the shading-disk 37 just above referred to, and like the same, provided with an annular series of substantially-rectangular perforations 42 which respectively snugly fit over the base-portions of the bar-like salient poles 33 of the said disk-like pole-unit 20. Like the shading-disk 37, the shading-disk 41 is provided with radial slots 43 which intersect respectively each alternate one of the perforations 42. The remaining three perforations 42 are not intersected by slots and are therefore electrically continuous, so that a rotating-field effect is achieved in the salient poles 33 considered as a group, in a manner similar to that described in connection with the group of salient poles 32.

The shading-disk 41, in addition to its perforations 42 and its radial slots 43, is provided with an annular series of sockets 44 into each of which projects the stabilizing-tenon 36 of one of the salient poles 32 of the cup-shaped pole-unit 19.

Surrounding the salient poles 32 and 33 is a ring-like energizing-coil 45 which is thus located axially intermediate the end-wall 22 of the cup-shaped pole-unit 19 and the disk-like pole-unit 20 which together constitute two complemental spaced-apart magnetic portions from which the salient poles 32 and 33 respectively project. The said energizing-coil 45 is provided with two lead-wires 46 and 47 which are adapted to be connected by any suitable means to a source of alternating or other sinuous current for the purpose of energizing the said coil.

Returning now to the center-arbor 15 upon which the rotor-unit 18 rotates, it will be noted by reference to Fig. 3 that the said center-arbor bears at its forward end in the shading-disk 37 and bears at its rear end in a substantially-triangular bearing-plate 48 which is held in spaced relationship rearwardly of the disk-like pole-unit 20 by means of a plurality of pillars 49 to which latter the said bearing-plate is removably attached by means of screws 50 entering the said pillars.

As thus constructed and arranged, the rotor-unit 10, including the drive-pinion 18 forming a unitary part thereof, rotates upon the center-arbor 15, which latter is free for independent rotation by virtue of its being supported for rotation, as above described, in both the shading-disk 37 and the bearing-plate 48.

The drive-pinion 18 of the rotor-unit 10 meshes into and drives a gear-wheel 51 mounted for rotation upon a stud 52 and rigidly carrying a pinion 53. The said pinion 53 meshes into and drives a gear-wheel 54 which is staked or otherwise rigidly secured to the center-arbor 15 at a point intermediate the drive-pinion 18 and the inner face of the bearing-plate 48.

The extreme rear portion of the center-arbor 15 which projects beyond the rear of the bearing-plate 48 has staked or otherwise secured to it a pinion 55 meshing into and driving a gear-wheel 56 (Figs. 1 to 4 inclusive) which is staked or otherwise rigidly secured to the rear end of a power-output shaft 57.

The rear end of the power-output shaft 57 is journaled in the bearing-plate 48 while its front portion is journaled in the forward portion of a bearing-bushing 58 rigidly mounted in the end-wall 22 of the cup-shaped pole-unit 19. The bearing-bushing 58 is provided with a relatively-slender rearwardly-projecting tubular oil-guard 59 having an internal diameter considerably larger than the diameter of the power-output shaft 57 and extending into a position closely adjacent the forward face of the shading-disk 41, as is especially well shown in Fig. 4. To prevent undue axial displacement of the said power-output shaft 57, the same is provided with a collar 60 located intermediate the bearing-plate 48 and the disk-like pole-unit 20.

The entire motor structure above described is adapted to be enclosed in any suitable oil-tight housing such, for instance, as the housing illustrated in my copending application above referred to, so that as the gear-train already described revolves, a supply of lubricant may be constantly picked up by the said gear-train.

In Fig. 9 is illustrated a modified form of rotor-unit which includes a pair of oppositely-facing cup-shaped rotor-elements 61—61 corresponding to the rotor-elements 12—12 before described and like the same spaced from each other by a salient-poled rotor-element here designated by the reference character 62 and corresponding to the rotor-element 13 before described.

The rotor-elements 61—61 and 62 are rigidly attached to a composite rotor-hub generally designated by the reference character 63 and including a relatively-long and slender sleeve 64 having a bearing-passage 65 of relatively-small diameter at its rear end and having the major portion of its length provided with an interior oil-chamber 66. The said oil-chamber 66 is of an internal diameter sufficiently large to clear a shaft having a diameter corresponding to the bearing-passage 65 and to provide a reservoir for oil or other lubricant. Forced with a drive-fit into the forward end of the oil-chamber 66 in the rotor-hub 63 is a bearing-bushing 67 having an axial bearing-passage 68 therein of a diameter substantially corresponding to the diameter of the bearing-passage 65 before referred to.

The sleeve 64 of the rotor-hub 63 is provided with an integral forwardly-facing stop-shoulder 69 and fitted over the forward portion of the said sleeve with a drive-fit and in engagement with the said stop-shoulder 69 is a bushing 70 having an annular outwardly-projecting flange 71. The rotor-elements 61—61 and 62 are centrally apertured to fit over the body-portion of the said bushing 70 and are clamped in place against the flange 71 thereof by means of a collet 72 forced onto the forward end of the body-portion of the bushing 70. In this manner the rotor-elements 61—61 and 62 are rigidly attached to the sleeve 64 for rotation therewith.

Cut into the periphery of the rear portion of the sleeve 64 is a plurality of longitudinally-extending grooves 73 resulting in the formation of a plurality of gear-teeth 74 designed and adapted to function as a drive-pinion in a manner corresponding to that described in connection with the drive-pinion 18 of the structure of Figs. 1 to 8 inclusive.

The grooves 73 which result in the formation of the gear-teeth 74 above described extend sufficiently rearwardly so as to "break through," so to speak, into the interior of the oil-chamber 66 and provide a plurality of oil-passages 75 interconnecting each groove 73 with the said oil-chamber 66.

By means of the construction and arrangement of parts wherein the rotor-hub 11 or its equivalent is provided with a drive-pinion or the like organized with it in such manner as to provide for the ingress of lubricant into the interior of the said rotor-hub, the smooth chatterless running of the rotor-unit is assured over long periods of use.

Furthermore, by organizing the parts so that the rotor-unit revolves upon the independently-rotatable center-arbor 15 or its equivalent within the encircling energizing-coil 45, a very compact and rugged construction results wherein the reduction-train is compacted and the over-all size of the motor structure is kept at a minimum.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An electric motor structure, including in combination: a field-structure having salient poles; a rotor-supporting arbor; a rotor-unit located for rotation in the magnetic field of the said field-structure and comprising a tubular hub-portion having an axial passage therethrough for the reception of the said rotor-supporting arbor; and a drive-pinion projected at one end of and rotatable with the said hub-portion, the said drive-pinion also having an axial passage therethrough registering with the axial passage of said hub-portion for extension of the said rotor-supporting arbor beyond the axial passage of the hub-portion and into and through the axial passage of said drive-pinion, and the said drive-pinion having external grooves communicating with the axial passage in the said hub-portion independently of the axial passage in the said drive-pinion to thereby admit lubricant to the interior of the said hub-portion.

2. An electric motor structure including in combination: a field-structure having salient poles; a rotor-supporting arbor; a rotor-unit located for rotation in the magnetic-field of the said field structure and comprising, a tubular hub-portion having an axial passage therethrough for the reception of the said rotor-supporting arbor; and a drive-pinion having gear-teeth thereon and coupled to the said hub-portion, the said drive-pinion being projected at one end of said hub-portion and also having an axial passage registering with the axial passage of said hub-portion for extension of the said rotor-supporting arbor beyond the axial passage of the hub-portion and into and through the axial passage of said drive-pinion, and the gaps between the gear-teeth of the said drive-pinion communicating with the axial passage in the said hub-portion to supply lubricant thereinto.

3. An electric motor structure, including in combination: a field-structure having salient poles; a rotor-supporting arbor; and a rotor-unit located for rotation in the magnetic-field of the said field-structure and comprising, a tubular hub-portion having an axial passage therethrough for the accommodation of the said rotor-supporting arbor and having a contracted portion bearing upon the said rotor-supporting arbor and having an opposite enlarged end clearing the said rotor-supporting arbor; and a drive-pinion secured within the enlarged end of the axial passage in the said hub-portion and having an axial passage therethrough, the said drive-pinion having the wall-surface of its axial passage bearing upon the said rotor-supporting arbor, and the said drive-pinion having external grooves communicating with the axial passage in the said enlarged end of the hub-portion independently of the axial passage in the said drive-pinion to thereby admit lubricant to the interior of the said hub-portion.

4. An electric motor structure, including in combination: a field-structure having salient poles; a rotor-supporting arbor; and a rotor-unit located for rotation in the magnetic-field of the said field-structure and comprising, a tubular hub-portion having an axial passage therethrough for the accommodation of the said rotor-supporting arbor and having one contracted portion bearing upon the said rotor-supporting arbor and having an opposite enlarged end to clear the said rotor-supporting arbor; and a drive-pinion secured within the enlarged end of the axial passage in the said hub-member and having an axial passage therethrough, the said drive-pinion having the wall-surface of its axial passage bearing upon the said rotor-supporting arbor, and the grooves between the teeth of the said drive-pinion communicating with the enlarged end of the axial passage in the said hub-portion to supply lubricant thereinto.

5. An electric motor structure, including in combination: a field-structure having salient poles; a rotor-supporting arbor; and a rotor-unit comprising, a magnetic-portion rotatable adjacent the salient poles of the said field-structure, a tubular hub-portion of non-magnetic material having an axial passage therethrough for the reception of the said rotor-supporting arbor; and a drive-pinion projected at one end of and rotatable with the said non-magnetic hub-portion, the said drive-pinion also having an axial passage registering with the axial passage of said hub-portion for extension of the said rotor-supporting arbor beyond the axial passage of the hub-portion and into and through the axial passage of said drive-pinion, and the said drive-pinion having external grooves communicating with the axial passage in the said non-magnetic hub-portion independently of the axial passage in the said drive-pinion to thereby admit lubricant to the interior of the said non-magnetic hub-portion.

6. An electric motor structure, including in combination: a field-structure having salient poles; a rotor-supporting arbor; and a rotor-unit comprising, a magnetic-portion rotatable adjacent the salient poles of the said field-structure, a tubular hub-portion of non-magnetic material having an axial passage therethrough for the reception of the said rotor-supporting arbor, and a drive-pinion having gear-teeth thereon and coupled to the said non-magnetic hub-portion, the said drive-pinion being projected at one end of said hub-portion and also having an axial passage registering with the axial passage of said hub-portion for extension of the said rotor-supporting arbor beyond the axial passage of the hub-portion and into and through the axial passage of said drive-pinion, and the gaps between the gear-teeth of the said drive-pinion communicating with the axial passage in the said non-magnetic hub-portion to supply lubricant thereinto.

7. An electric motor structure, including in combination: a field-structure having salient poles; a rotor-supporting arbor; and a rotor-unit comprising, a magnetic-portion rotatable adjacent the salient poles of the said field-structure, a tubular hub-portion of non-magnetic material having an axial passage therethrough for the reception of the said rotor-supporting arbor and having a contracted portion bearing upon the said rotor-supporting arbor and also having an opposite enlarged end clearing the said rotor-supporting arbor; and a drive-pinion having an axial passage receiving the said rotor-supporting-arbor and bearing upon the said arbor, the said drive-pinion secured within the enlarged end of the axial passage in the said non-magnetic hub-portion, and the said drive-pinion having external grooves communicating with the axial passage in the said non-magnetic hub-portion independently of the axial passage in the said drive-pinion to thereby admit lubricant to the interior of the said non-magnetic hub-portion.

8. An electric motor structure, including in combination: a field-structure having salient poles; a rotor-supporting arbor; and a rotor-unit comprising, a magnetic-portion rotatable adjacent the salient poles of the said field-structure, a tubular hub-portion of non-magnetic material having an axial passage therethrough for the reception of the said rotor-supporting arbor, and having a contracted portion bearing upon the said rotor-supporting arbor and also having an opposite enlarged end clearing the said rotor-supporting arbor, and a drive-pinion bearing upon the said arbor and secured within the enlarged end of the axial passage in the said non-magnetic hub-portion, the gaps between the gear-teeth of the said drive-pinion communicating with the enlarged end of the axial passage in the said non-magnetic hub-portion to supply lubricant thereinto.

ARTHUR B. POOLE.